(12) United States Patent
Noma et al.

(10) Patent No.: US 6,501,627 B2
(45) Date of Patent: Dec. 31, 2002

(54) SPIN-VALVE MAGNETORESISTIVE HEAD, AND COMPOSITE-TYPE MAGNETIC HEAD AND MAGNETIC RECORDING MEDIUM DRIVE USING THE SAME

(75) Inventors: Kenji Noma, Kawasaki (JP); Hitoshi Kanai, Kawasaki (JP); Junichi Kane, Kawasaki (JP); Kenichi Aoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/994,262

(22) Filed: Nov. 26, 2001

(65) Prior Publication Data

US 2002/0034057 A1 Mar. 21, 2002

Related U.S. Application Data

(63) Continuation of application No. PCT/JP99/03613, filed on Jul. 5, 1999.

(51) Int. Cl.[7] ............................................. G11B 5/39
(52) U.S. Cl. ................................................. 360/324.12
(58) Field of Search ...................... 360/324.11, 324.12, 360/324, 324.1

(56) References Cited

U.S. PATENT DOCUMENTS

| | | | | |
|---|---|---|---|---|
| 5,408,377 A | * | 4/1995 | Gurney et al. | 324/252 |
| 5,422,571 A | * | 6/1995 | Gumey et al. | 324/252 |
| 5,583,725 A | * | 12/1996 | Coffey et al. | 324/252 |
| 6,090,498 A | | 7/2000 | Omata et al. | 428/692 |
| 6,154,349 A | * | 11/2000 | Kanai et al. | 360/324.11 |
| 6,157,524 A | * | 12/2000 | Nakazawa et al. | 360/324.12 |
| 6,292,335 B1 | * | 9/2001 | Gill | 360/324.11 |
| 6,295,186 B1 | * | 9/2001 | Hasegawa et al. | 360/324.11 |
| 6,313,973 B1 | * | 11/2001 | Fuke et al. | 360/324.1 |

FOREIGN PATENT DOCUMENTS

| | | |
|---|---|---|
| JP | 07-287819 | 10/1995 |
| JP | 7-287819 A | 10/1995 |
| JP | 08287426 A | 1/1996 |
| JP | 8-36715 A | 2/1996 |
| JP | 08-036715 | 2/1996 |
| JP | 8-180327 A | 7/1996 |
| JP | 08-180327 | 7/1996 |
| JP | 8-221715 A | 8/1996 |
| JP | 08-221715 | 8/1996 |
| JP | 09054916 A | 2/1997 |
| JP | 09073611 A | 3/1997 |
| JP | 9-198626 A | 7/1997 |
| JP | 09-198626 | 7/1997 |
| JP | 9-282613 A | 10/1997 |
| JP | 09-282613 | 10/1997 |
| JP | 10-242544 | 9/1998 |
| JP | 10284769 A | 10/1998 |
| JP | 10-284769 | 10/1998 |
| JP | 10-284769 A | 10/1998 |

\* cited by examiner

Primary Examiner—Brian E. Miller
(74) Attorney, Agent, or Firm—Greer, Burns & Crain, Ltd.

(57) ABSTRACT

A spin-valve magnetoresistive head having end parts of a free magnetic layer insensitive to an external magnetic field so as to improve sensitivity is provided. The spin-valve magnetoresistive head includes, at least on the terminal part sides, a lamination formed of a first antiferromagnetic layer, a soft magnetic layer, an antiparallel coupling intermediate layer, and a first free magnetic layer.

9 Claims, 13 Drawing Sheets

SPIN-VALVE MAGNETORESISTIVE HEAD, AND COMPOSITE-TYPE MAGNETIC HEAD AND MAGNETIC RECORDING MEDIUM DRIVE USING THE SAME

This is a continuation of International PCT Application No. PCT/JP/03613 filed on Jul. 5, 1999, which was not published in English.

TECHNICAL FIELD

The present invention relates to spin-valve magnetoresistive heads, and more particularly to a pin-valve magnetoresistive head having on terminal sides laminations for applying a bias magnetic field to a free magnetic layer and a composite-type head and a drive using the same.

BACKGROUND ART

At present, an AMR (Anisotropic Magnetoresistive) device is most frequently used in a magnetic head mounted in a magnetic recording medium recording/reproduction apparatus such as an HDD (Hard Disk Drive). However, as recording density increases, a full-scale movement toward practical use of a spin-valve magnetoresistive magnetic head (hereinafter, an SVMR head) using a more sensitive SVMR (Spin-valve Magnetoresistive) film has started, and the commercial production of the SVMR head has begun.

A common SVMR head includes a basic lamination as shown in FIG. 1. A device part is formed of an SVMR film formed by layering an antiferromagnetic layer 102, a pinned magnetic layer 103, a nonmagnetic layer 104, and a free magnetic layer in the order described on a substrate 101. A width C of the device part serves as a magnetic sensitive part S for detecting a signal magnetic field Hsig from a magnetic recording medium such as a hard disk. The SVMR head has terminal parts T1A and T1B on both ends of the device part in the direction of the width C. In the terminal parts T1A and T1B, conductive electrode terminals 106A and 106B are provided on hard ferromagnetic layers 107A and 107B, for instance. The hard ferromagnetic layers 107A and 107B are magnetizing bias means for magnetizing the free magnetic layer 105 in the direction of an arrow (the direction of an axis of easy magnetization) from the terminal parts T1A and T1B.

FIG. 2 shows an SVMR head 200 of another type. The SVMR head 200 is of a type called a terminal overlay. A basic structure is equal to that of the SVMR head 100 shown in FIG. 1. An SVMR device part is formed by layering an antiferromagnetic layer 202, a pinned magnetic layer 203, a nonmagnetic layer 204, and a free magnetic layer 205 in the order described on a substrate 201. Hard ferromagnetic layers 207A and 207B are provided on the terminal part T2A and T2B sides. However, electrode terminals 206A and 206B of terminal parts T2A and T2B are formed on both ends of the device part so as to cover parts thereof. The overlay-type SVMR head 200 has the magnetic sensitive part S narrower than the device width C by the width of an overlay by the terminal parts T2A and T2B. Thus, the overlay-type SVMR head 200 is devised so that reading and reproduction can be performed even if the track width of the magnetic recording medium is narrowed as the magnetic recording density increases.

FIG. 3 shows yet another overlay-type SVMR head 300. An SVMR film is formed by layering an antiferromagnetic layer 302, a pinned magnetic layer 303, a nonmagnetic layer 304, and a free magnetic layer 305 in the order described on a substrate 301. Terminal parts T3A and T3B are formed by ferromagnetic layers 307A and 307B and terminal electrodes 306A and 306B covering both ends of the SVMR film. As the ferromagnetic layers 307A and 307B, single-layer hard ferromagnetic layers or single-layer antiferromagnetic layers are employed. A bias magnetic field to set the magnetization orientation of the free magnetic layer in the direction of an arrow is applied by a static magnetic field if the ferromagnetic layers 307A and 307B are the single-layer hard ferromagnetic layers, and by an exchange coupling magnetic field if the ferromagnetic layers 307A and 307B are the single-layer antiferromagnetic layers.

Unlike the above-described SVMR heads 100 and 200 shown in FIGS. 1 and 2, in the SVMR head 300 shown in FIG. 3, the SVMR film formed of the antiferromagnetic layer 302, the pinned magnetic layer 303, the nonmagnetic layer 304, and the free magnetic layer 305 extends from the terminal part T3A side to the other terminal T3B side. However, a part reacting to an external magnetic field as the SVMR head 300 is a part between the terminal parts T3A and T3B. Therefore, in this specification, a part of an SVMR head which parts includes an SVMR film and magnetically senses the signal magnetic field Hsig is referred to as a device part. Further, parts on both sides of the device part which parts include conductive electrode terminals and, in some cases, lamination parts formed below the electrode terminals may be referred to as terminal parts.

The SVMR head 100 applies a bias magnetic field from the hard ferromagnetic layers 107A and 107B on the terminal part sides to the free magnetic layer 105. Therefore, such an uneven state is entered that the bias magnetic field from the hard ferromagnetic layers 107A and 107B is strong on both ends of the free magnetic layer 105 and weak in a center part thereof. Accordingly, it is difficult to make the free magnetic layer 105 to act as a single magnetic domain, thus, in some cases, preventing the signal magnetic field Hsig from the magnetic recording medium from being detected with sufficient sensitivity.

Further, leakage magnetic fields from the hard ferromagnetic layers 107A and 107B extend as far as the pinned magnetic layer 103. Therefore, there is a problem of an inclination of the magnetization direction of the pinned magnetic layer 103 that should be fixed parallel to the signal magnetic field Hsig.

Moreover, the SVMR head 100, in its production process, has the SVMR film formed by layering the antiferromagnetic layer 102, the pinned magnetic layer 103, the nonmagnetic layer 104, and the free magnetic layer 105 in the order described on the substrate 101, and, normally, is etched thereafter to have the device part of a given size. By this etching, nonmagnetic parts N, which have such disordered crystal states as to lose magnetism, are formed on both ends of the device part. The nonmagnetic parts N are also formed on both ends of the free magnetic layer 105 reacting to the signal magnetic layer Hsig. This causes a problem that the width of the device part for magnetic sensing becomes narrower than is designed and a problem that noises are generated.

The overlay-type SVMR head 200 shown in FIG. 2 has the device part formed by etching as the SVMR head 200 of FIG. 1. If the electrode terminals 206A and 206B are to be formed to exactly cover the above-described nonmagnetic parts N, the SVMR head 200 can be formed to maintain its sensitivity and have a narrower device width. However, it is very difficult to position the electrode terminals 206A and 206B exactly on the nonmagnetic parts N in the production process. Further, both ends of the free magnetic layer 205 which ends are overlaid with the electrode terminals 206A and 206B still functions as a free magnetic layer. Therefore, both ends of the free magnetic layer 205 react to the signal magnetic field Hsig, which may cause noise generation. Further, in the case of reading a hard disk having a narrow track width, these parts read adjacent tracks, thus causing so-called crosstalk to be generated.

Further, the overlay-type SVMR head 300 has the ferromagnetic layers 307A and 307B flatly contacting the free magnetic layers 305 to apply the strong bias magnetic field thereto from the terminal parts. However, if the ferromagnetic layers 307A and 307B are single-layer hard ferromagnetic layers, it is difficult to secure a sufficient thickness in the terminal parts. This prevents application of a bias magnetic field required for controlling the magnetization direction of the free magnetic layer 305, thus precluding the device part from being sensitive to the signal magnetic field Hsig.

On the other hand, if the ferromagnetic layers 307A and 307B are single-layer antiferromagnetic layers, the bias magnetic field is applied from the antiferromagnetic layers to the free magnetic layer 305 by the exchange coupling magnetic field. Normally, the bias magnetic field is in a range of approximately 100 to 400 Oe, and is caused by the signal magnetic field Hsig from the magnetic recording medium to rotate up to the free magnetic layer 305 existing in the terminal parts, thus causing noises to be generated.

A description will be given below in detail.

In this specification, a term "orientation" is used to mean a given direction with an arrow or the like, and a term "direction" is used to mean the direction and a direction reverse thereto without considering the orientation.

DISCLOSURE OF THE INVENTION

Accordingly, an object of the present invention is to provide a spin-valve magnetoresistive head (an SVMR head) in which the above-described disadvantages are eliminated and a magnetic recording medium drive having such a head mounted therein.

The above object of the present invention is achieved by a spin-valve magnetoresistive head having a device part and terminal parts provided to both ends of the device part, the spin-valve magnetoresistive head including a first free magnetic layer formed from one to the other of the terminal parts and a lamination in the terminal parts on the first free magnetic layer, the lamination including an antiparallel coupling intermediate layer, a soft magnetic layer, and a first antiferromagnetic layer, the antiparallel coupling intermediate layer having a function of making front and rear magnetization orientation of a magnetic layer contacting the antiparallel coupling intermediate layer substantially antiparallel, the first antiferromagnetic layer applying to the soft magnetic layer a bias magnetic field substantially perpendicular to a direction of an external magnetic field to be detected.

In a preferred embodiment of the invention, the first antiferromagnetic layer applies the bias magnetic field to the soft magnetic layer in the terminal parts. A magnetization direction caused by the bias magnetic field is substantially perpendicular to a direction of a signal magnetic field Hsig from a magnetic recording medium. Here, being substantially perpendicular means being perpendicular or inclined within approximately ±10 degrees to the perpendicular state.

Further, the soft magnetic layer and the first free magnetic layer oppose each other with the antiparallel coupling intermediate layer being interposed therebetween in the terminal parts. The antiparallel coupling intermediate layer makes the magnetization orientations of the soft magnetic layer and the first free magnetic layer substantially antiparallel. Here, being substantially antiparallel means being parallel or inclined within ±10 degrees to the parallel state with a reverse magnetization orientation.

The soft magnetic layer and the first free magnetic layer are magnetically coupled to each other across the antiparallel coupling intermediate layer. That is, the magnetic fields of the soft magnetic layer and the first free magnetic layer come to draw one closed loop. On the other hand, the soft magnetic layer and the first free magnetic layer help each other against an external magnetic field to prevent their magnetization directions from being inclined.

In this SVMR head of the present invention, when the external magnetic field is zero, the magnetization direction of the first free magnetic layer is the same in the device part and in the terminal parts. On the other hand, when subjected to the signal magnetic field Hsig, the magnetization direction of the first free magnetic layer turns only in the device part. At this point, as previously described, the magnetization direction of the first free magnetic layer is insensitive in the terminal parts, being held by the soft magnetic layer and the antiparallel coupling intermediate layer. Accordingly, the magnetization of the first free magnetic layer is prevented from turning with respect to the signal magnetic field Hsig in the terminal parts.

A protection layer, an insulating layer, and/or a gap layer may be added to the above-described SVMR head as required.

Then, in the spin-valve magnetoresistive head, the antiparallel coupling intermediate layer may be preferably formed from the one to the other of the terminal parts through the device part, and a nonmagnetic layer, a pinned magnetic layer, and a second antiferromagnetic layer may be provided in an order described under the first free magnetic layer from a side thereof.

Further in the spin-valve magnetoresistive head, the antiparallel coupling intermediate layer and the soft magnetic layer may be preferably formed from the one to the other of the terminal parts through the device part, the soft magnetic layer may serve as a second free magnetic layer, and a nonmagnetic layer, a pinned magnetic layer, and a second antiferromagnetic layer may be provided in an order described under the first free magnetic layer from a side thereof.

Further in the spin-valve magnetoresistive head, the antiparallel coupling intermediate layer and the soft magnetic layer may be also preferably formed from the one to the other of the terminal parts, the soft magnetic layer may serve as a second free magnetic layer, and a nonmagnetic layer, a pinned magnetic layer, and a second antiferromagnetic layer maybe provided in an order described on the second free magnetic layer from a side thereof in the device part.

Further in the spin-valve magnetoresistive head, a nonmagnetic layer, a pinned magnetic layer, and a second antiferromagnetic layer may be preferably provided in an order described on the first free magnetic layer from a side thereof in the device part.

Further in the spin-valve magnetoresistive head, it is preferable that the first antiferromagnetic layer should have an exchange coupling magnetic field of 100 to 400 Oe with the soft magnetic layer or the second free magnetic layer. If the exchange coupling magnetic field falls within the range of 100 to 400 Oe, the first free magnetic layer can be magnetically fixed in a given direction through the antiparallel coupling intermediate layer in the terminal parts so as to be insensitive to the external magnetic field. On the other hand, the first free magnetic layer can be made to act as a single magnetic domain to be turned in the device part when the signal magnetic field Hsig is input.

Further in the spin-valve magnetoresistive head, it is preferable that the antiparallel coupling intermediate layer should include ruthenium.

Further, the present invention preferably includes a composite-type magnetic head having a magnetic head for reproduction and a magnetic head for recording, wherein the magnetic head for reproduction is a spin-valve magnetoresistive head including a device part, terminal parts provided to both ends of the device part, and a lamination including a first free magnetic layer formed from one to the other of the terminal parts, an antiparallel coupling intermediate layer in the terminal parts on the first free magnetic layer, a soft magnetic layer, and a first antiferromagnetic layer, the antiparallel coupling intermediate layer having a function of making front and rear magnetization orientation of a magnetic layer contacting the antiparallel coupling intermediate layer substantially parallel, the first antiferromagnetic layer applying to the soft magnetic layer a bias magnetic field substantially perpendicular to a direction of an external magnetic field to be detected.

Furthermore, the present invention preferably includes a magnetic recording medium drive including a magnetic recording medium and a composite-type magnetic head for recording and reproduction, the composite-type magnetic head opposing a surface of the magnetic recording medium, the magnetic recording medium drive including a spin-valve magnetoresistive head as a reproducing magnetic head part of the composite-type magnetic head, the spin-valve magnetoresistive head including a device part, terminal parts provided to both ends of the device part, and a lamination including a first free magnetic layer formed from one to the other of the terminal parts, an antiparallel coupling intermediate layer in the terminal parts on the first free magnetic layer, a soft magnetic layer, and a first antiferromagnetic layer, the antiparallel coupling intermediate layer having a function of making front and rear magnetization orientation of a magnetic layer contacting the antiparallel coupling intermediate layer substantially antiparallel, the first antiferromagnetic layer applying to the soft magnetic layer a bias magnetic field substantially perpendicular to a direction of an external magnetic field to be detected.

BEST MODE FOR CARRYING OUT THE INVENTION

Figure 1:
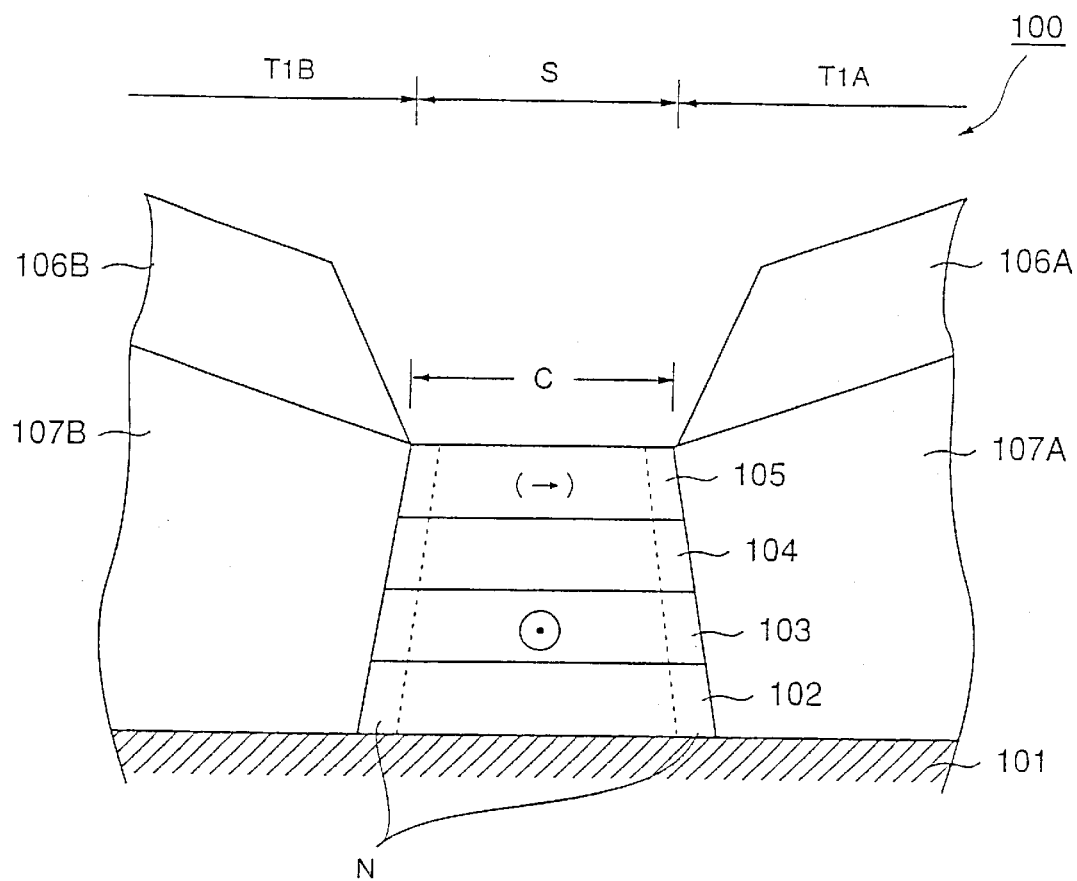
FIG. 1 is a schematic diagram showing a structure of a conventional SVMR head.
Figure 2:
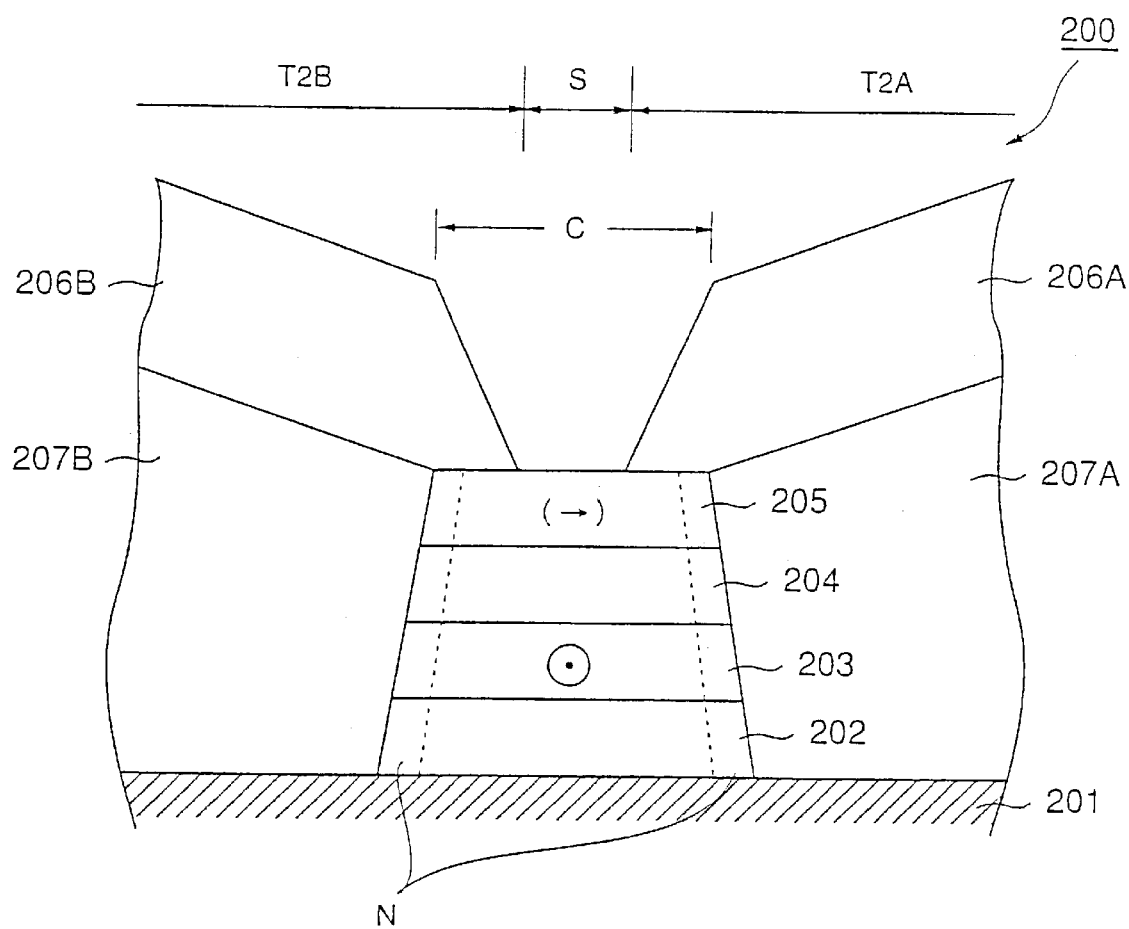
FIG. 2 is a schematic diagram showing another conventional overlay-type SVMR head.
Figure 3:
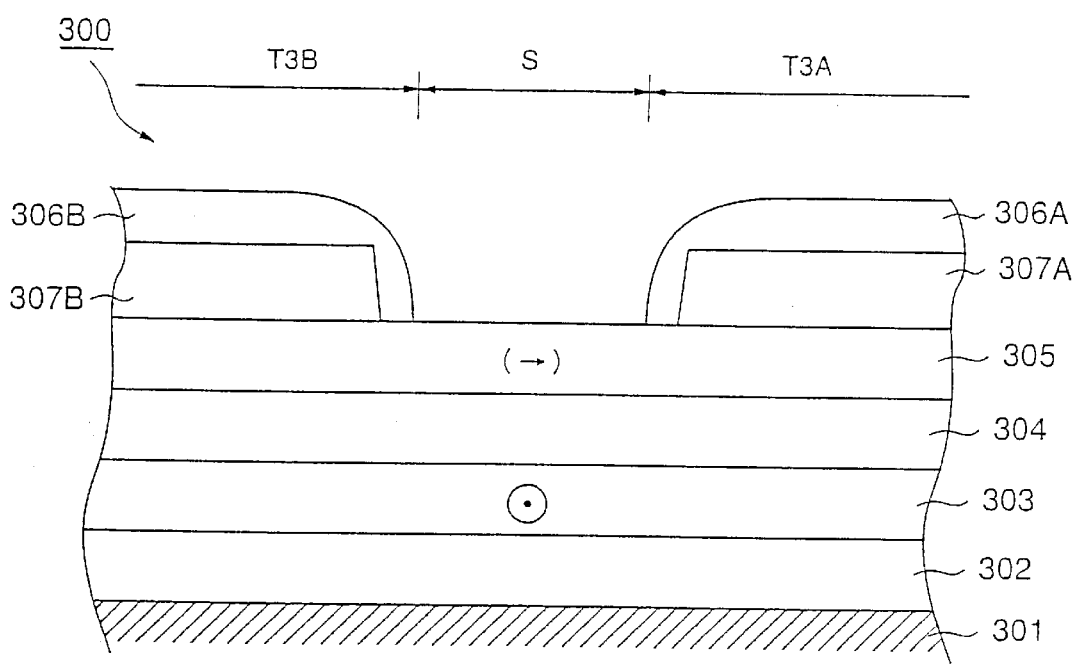
FIG. 3 is a schematic diagram showing another conventional overlay-type SVMR head.
Figure 4:
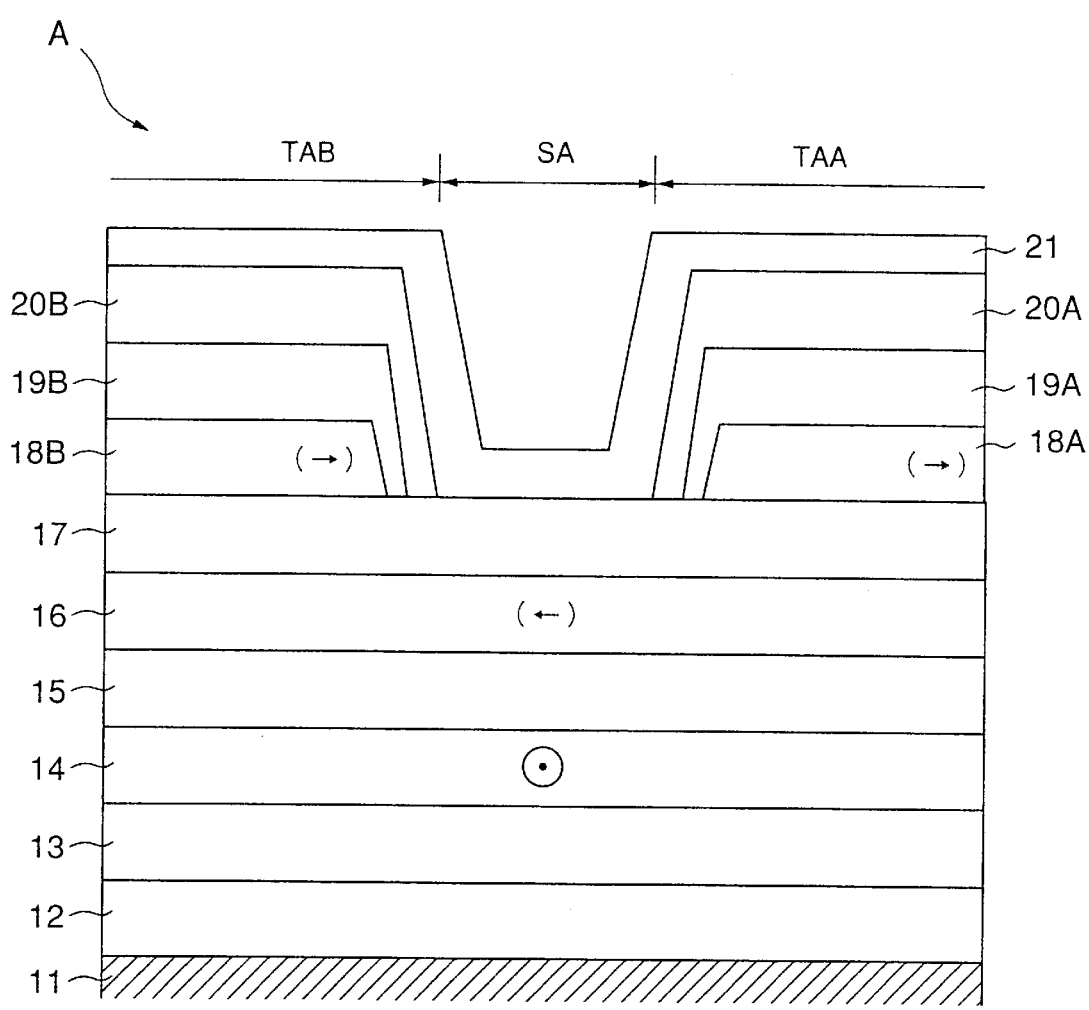
FIG. 4 is a sectional view of a principal part of an SVMR head of a first embodiment.

A description will be given below, based on FIG. 4, of a first embodiment of the present invention. FIG. 4 is a sectional view of a principal part of an SVMR head A of the first embodiment of the present invention. The SVMR head A of this embodiment is of an overlay type. Shown is a structure including laminations of first antiferromagnetic layers 19A and 19B, soft magnetic layers 18A and 18B, an antiparallel coupling intermediate layer 17, and a first free magnetic layer 16 on the terminal part TAA and TAB sides.

The SVMR head A includes a basic lamination formed by layering a base layer 12, a second antiferromagnetic layer 13, a pinned magnetic layer 14, a nonmagnetic layer 15, the first free magnetic layer 16, and the antiparallel coupling intermediate layer 17 in the order described from the bottom on an aluminum or ceramic, for instance, insulating substrate 11.

The soft magnetic layers 18A and 18B and the first antiferromagnetic layers 19A and 19B are further layered in the order described on the terminal part TAA and TAB sides of the antiparallel coupling intermediate layer 17 that is the uppermost layer. Conductive electrode terminals 20A and 20B are provided on the first antiferromagnetic layers 19A and 19B.

The base layer 12 is provided for crystal orientation or crystal structure control, and chromium (Cr) may be used for the base layer 12. The second antiferromagnetic layer 13 fixes magnetization so that the magnetization direction of the pinned magnetic layer 14 is parallel to the signal magnetic field Hsig or inclined within ±20 degrees thereto. As the second antiferromagnetic layer 13, it is preferable to employ a magnetic material whose exchange coupling magnetic field to the pinned magnetic layer 14 is 100 Oe or over; preferably between 200 and 600 Oe. Further, either a regular or irregular type may be employed as the magnetic material, which may be selected, for instance, from palladium-platinum-manganese (PdPtMn), platinum-manganese (PtMn), palladium-manganese (PdMn), nickel-manganese (NiMn), chromium-manganese (CrMn), nickel oxide (NiO), and iridiummanganese (IrMn). As the pinned magnetic layer 14, a layer including cobalt-iron (CoFe) or cobalt-iron-boron (CoFeB) may be used, for instance. As the nonmagnetic layer 15, a layer including copper (Cu) may be used, for instance. As the first free magnetic layer 16, for instance, two layers including cobalt-iron (CoFe) and nickel-iron (NiFe), respectively, or two layers including cobalt-iron-boron (CoFeB) and nickel-iron (NiFe), respectively, may be used. As the antiparallel coupling intermediate layer 17, a layer including ruthenium (Ru) may be used, for instance.

Further, as the soft magnetic layers 18A and 18B on the terminal part TAA and TAB sides, for instance, layers including nickel-iron (NiFe) may be used. As the first antiferromagnetic layers 19A and 19B (which may turn into second free magnetic layers), a magnetic material of either a regular or irregular type may be employed. The magnetic material may be selected, for instance, from palladium-platinum-manganese (PdPtMn), platinum-manganese (PtMn), palladium-manganese (PdMn), nickel-manganese (NiMn), chromium-manganese (CrMn), nickel oxide (NiO), and iridiummanganese (IrMn).

However, on the terminal part TAA and TAB sides, the first antiferromagnetic layers 19A and 19B applies a bias magnetic field to the soft magnetic layers 18A and 18B so that the magnetization direction of the soft magnetic layers 18A and 18B is fixed to be substantially perpendicular to the signal magnetic field Hsig. For this purpose, it is preferable to use a magnetic material whose exchange coupling magnetic field to the soft magnetic layers 18A and 18B falls in the range of 100 to 400 Oe.

With respect to the film thickness of each of the above-described layers, each first antiferromagnetic layer has a film thickness of 0.005 to 0.05 µm. For instance, the film thickness falls in the range of 0.005 to 0.025 µm in the case of using PdPtMn, and is approximately 0.05 µm in the case of using NiO. Each soft magnetic layer (or the second free magnetic layer) has a film thickness of 0.002 to 0.01 µm. For instance, the film thickness falls within the range of 0.002 to 0.005 µm in the case of using NiFe. The antiparallel coupling intermediate layer has a film thickness of 0.0006 to 0.0009 µm in the case of using Ru, for instance. The first free magnetic layer has a film thickness of 0.0025 to 0.012 µm. For instance, the film thickness falls within the range of 0.0025 to 0.01 µm in the case of using layers including CoFe and NiFe, and of 0.003 to 0.012 µm in the case of using layers including CoFeB and NiFe.

Further, a film thickness of 0.002 to 0.005 µm, for instance, may be selected for the pinned magnetic layer, and a film thickness of 0.005 to 0.025 µm, for instance, may be selected for the second antiferromagnetic layer.

As the electrode terminals 20A and 20B, gold (Au), platinum (Pt), or copper (Cu), for instance, may be used. A sense Is current flows between the electrode terminals 20A and 20B to detect the signal magnetic field from a magnetic recording medium.

In the SVMR head A of the first embodiment, the first antiferromagnetic layers 19A and 19B applies the bias magnetic field to the soft magnetic layers 18A and 18B. The magnetization direction of the bias magnetic field is substantially perpendicular to the signal magnetic field Hsig (horizontal with a sheet surface in FIG. 4). In this embodiment, as indicated by arrows in FIG. 4, the magnetization orientation of the soft magnetic layers 18A and 18B is rightward.

Further, on the terminal part TAA and TAB sides, the first free magnetic layer 16 is magnetically coupled to the soft magnetic layers 18A and 18B across the antiparallel coupling intermediate layer 17. The magnetization orientation of the first free magnetic layer 16 is substantially (leftward or) antiparallel to that of a magnetic field applied from the soft magnetic layers 18A and 18B on the terminal part TAA and TAB sides with the antiparallel coupling intermediate layer 17 being interposed between the first magnetic layer 16 and the soft magnetic layers 18A and 18B.

The first free magnetic layer 16 forms closed magnetic fields with the soft magnetic layers 18A and 18B in terminal parts TAA and TAB, respectively. Therefore, the first free magnetic layer 16 and the soft magnetic layers 18A and 18B help each other to prevent an inclination against such an external magnetic field as to affect their magnetization orientations. As a result, turning is restricted in the first free magnetic layer 16 on the terminal part TAA and TAB sides when the first free magnetic layer 16 is subjected to the external magnetic field.

On the other hand, in a device part between the terminal parts TAA and TAB, the magnetization orientation of the first free magnetic layer 16 is leftward, following the magnetization orientation in both terminal parts TAA and TAB when the signal magnetic field Hsig is zero. However, magnetization to restrict the magnetization direction of the first free magnetic layer 16 is weak in the device part so that the magnetization direction can turn in response to the external magnetic field.

Therefore, when the signal magnetic field Hsig from the magnetic recording medium is input, the magnetization direction of the first free magnetic layer 16 turns in the device part in accordance with the signal magnetic field Hsig. This generates an angle between the magnetization directions of the first free magnetic layer 16 and the pinned magnetic layer 14 in the device part. A change in resistance proportional to the cosine of the angle appears as a change in the sense current flowing the terminal electrodes 19A and 19B. That is the signal magnetic field Hsig from the magnetic recording medium can be detected as a change in voltage.

According to the above-described SVMR head A of the first embodiment of the present invention, the first free magnetic layer 16 can certainly be insensitive to the external magnetic field on the terminal part TAA and TAB sides and be made to act as a single magnetic domain on the device part side. Therefore, unlike the conventional overlay-type SVMR head, no problems of noise and crosstalk resulting from a free magnetic layer existing in terminal parts are caused. Further, since the SVMR head A is of the overlay type with the terminal parts TAA and TAB being formed on both ends of an SVMR film, no nonmagnetic parts with broken crystals generated in processing the SVMR film exist around the device part. Further, since the bias magnetic field to the first free magnetic layer 16 uses the first antiferromagnetic layers 19A and 19B, no leakage magnetic field, which causes a problem in the case of using hard ferromagnetic layers, is generated. Therefore, the exchange coupling magnetic field from the second antiferromagnetic layer 13 for fixing the magnetization direction of the pinned magnetic layer 14 can be set weaker than conventionally.

Figure 5:
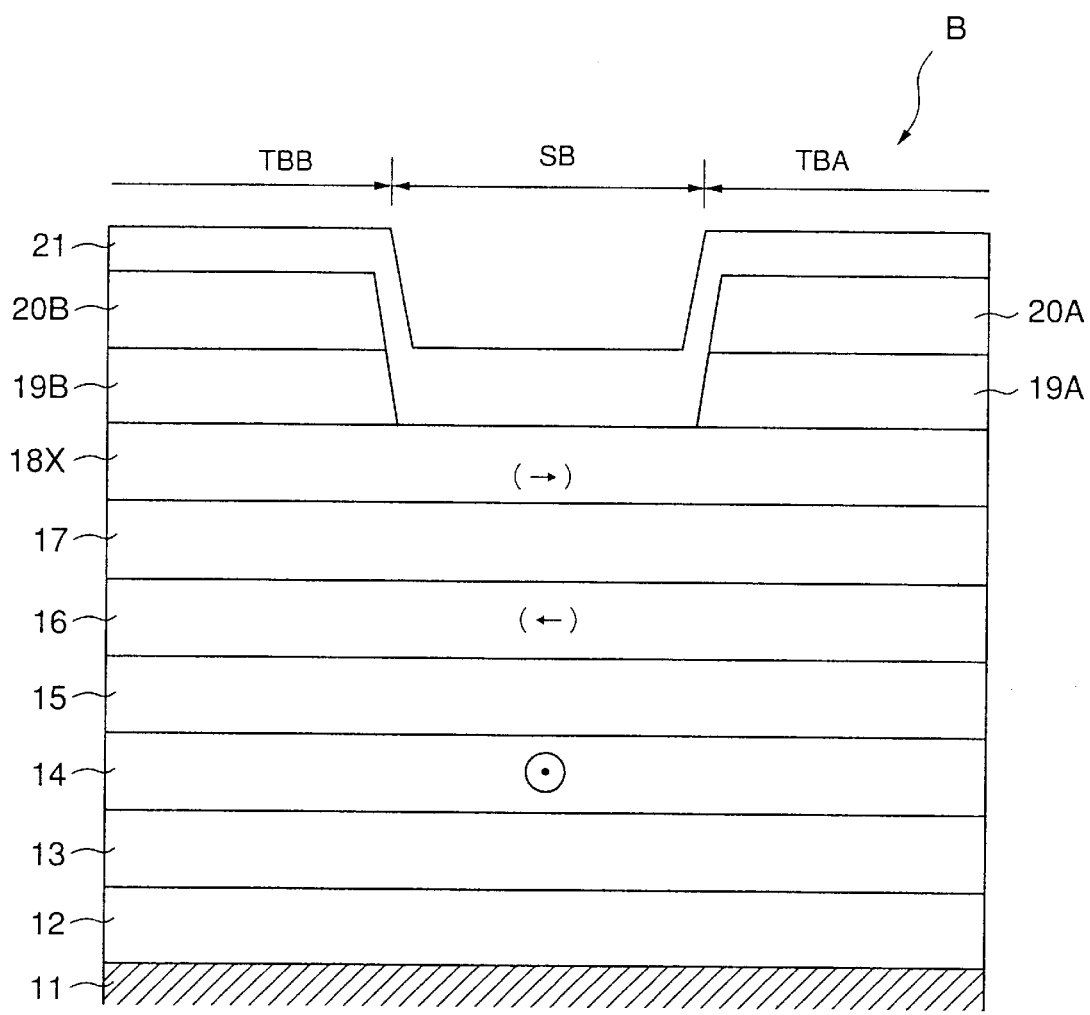
FIG. 5 is a sectional view of a principal part of an SVMR head of a second embodiment.
Figure 6:
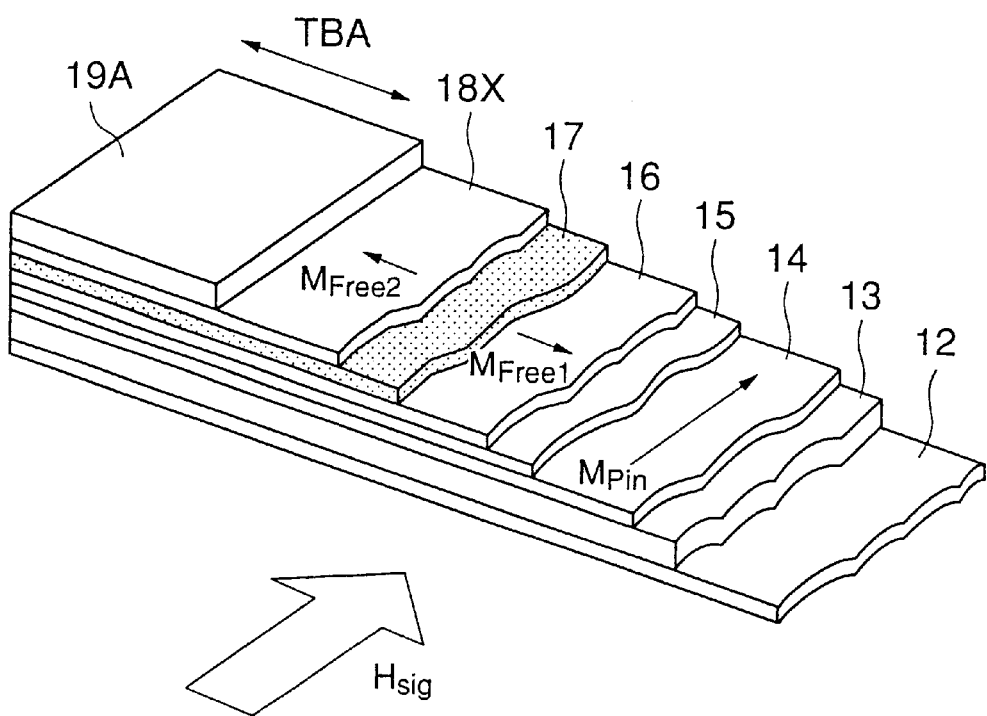
FIG. 6 is a perspective view of the SVMR head of a second embodiment, showing a layer structure thereof.

Next, a description will be given, based on FIGS. 5 and 6, of a second embodiment of the present invention. FIG. 5 is a sectional view of a principal part of an SVMR head B of the second embodiment of the present invention. FIG. 6 is a perspective view of a layer structure of the SVMR head B including a terminal part TBA on one side. The SVMR head B of this embodiment is also of the overlay type. The SVMR head B of this embodiment has a layer structure similar to the SVMR head A of the above-described first embodiment. An example is shown where a magnetic layer, which is the soft magnetic layers 18A and 18B in the SVMR head A, is provided successively from the terminal part TBA to a terminal part TBB as a second free magnetic layer 18X.

The same parts as those of the SVMR head of the first embodiment are marked with the same numerals. Further, if no particular explanation is given, conditions such as a material and a magnetization direction are equal to those in the case of the first embodiment.

In the second embodiment, laminations of the first antiferromagnetic layers 19A and 19B, the second free magnetic layer 18X, the antiparallel coupling intermediate layer 17, and the first free magnetic layer 16 are also included on the terminal part TBA and TBB sides.

On both terminal part TBA and TBB sides of the SVMR head B, first, the first antiferromagnetic layers 19A and 19B apply a bias magnetic field to the second free magnetic layer 18X. Further, the magnetic field of the second free magnetic layer 18X provides an antiparallel magnetic field to the first free magnetic layer 16 through the antiparallel coupling intermediate layer 17.

As shown in FIGS. 5 and 6, the magnetization orientation of the first free magnetic layer 16 and the second free magnetic layer 18X are in an antiparallel state if no external magnetic field exists in a device part, and are turned with the antiparallel state being maintained when the signal magnetic field Hsig is input as shown in FIG. 6. At this point, the first free magnetic layer 16 and the second free magnetic layer 18X are in an insensitive state on the terminal part TBA and TBB sides with their magnetization directions being fixed by the bias magnetic field from the first antiferromagnetic layers 19A and 19B.

According to the SVMR head B of the second embodiment, the first free magnetic layer 16 and the second free magnetic layer 18X can certainly be insensitive to the external magnetic field on the terminal part TBA and TBB sides and be made to act as a single magnetic domain on the device part side. Accordingly, unlike the conventional overlay-type SVMR head, no problems of noise and crosstalk resulting from a free magnetic layer existing in terminal parts are caused. Further, since the SVMR head B is of the overlay type with the terminal parts TBA and TBB being formed on both ends of an SVMR film, no nonmagnetic parts with broken crystals generated in processing the SVMR film exist around the device part. Further, since the bias magnetic field to the first free magnetic layer 16 uses the first antiferromagnetic layers 19A and 19B, no leakage magnetic field, which causes a problem in the case of using hard ferromagnetic layers, is generated.

The above-described SVMR head A of the first embodiment and SVMR head B of the second embodiment are of the overlay type. Accordingly, in their production process, their terminal parts can be formed to narrow the widths of their device parts. In this case, the signal magnetic field Hsig from a magnetic recording medium having its track width narrowed by an increase in recording density can be detected with sufficient sensitivity. The production methods of the above-described SVMR heads A and B will be described later.

Figure 7:
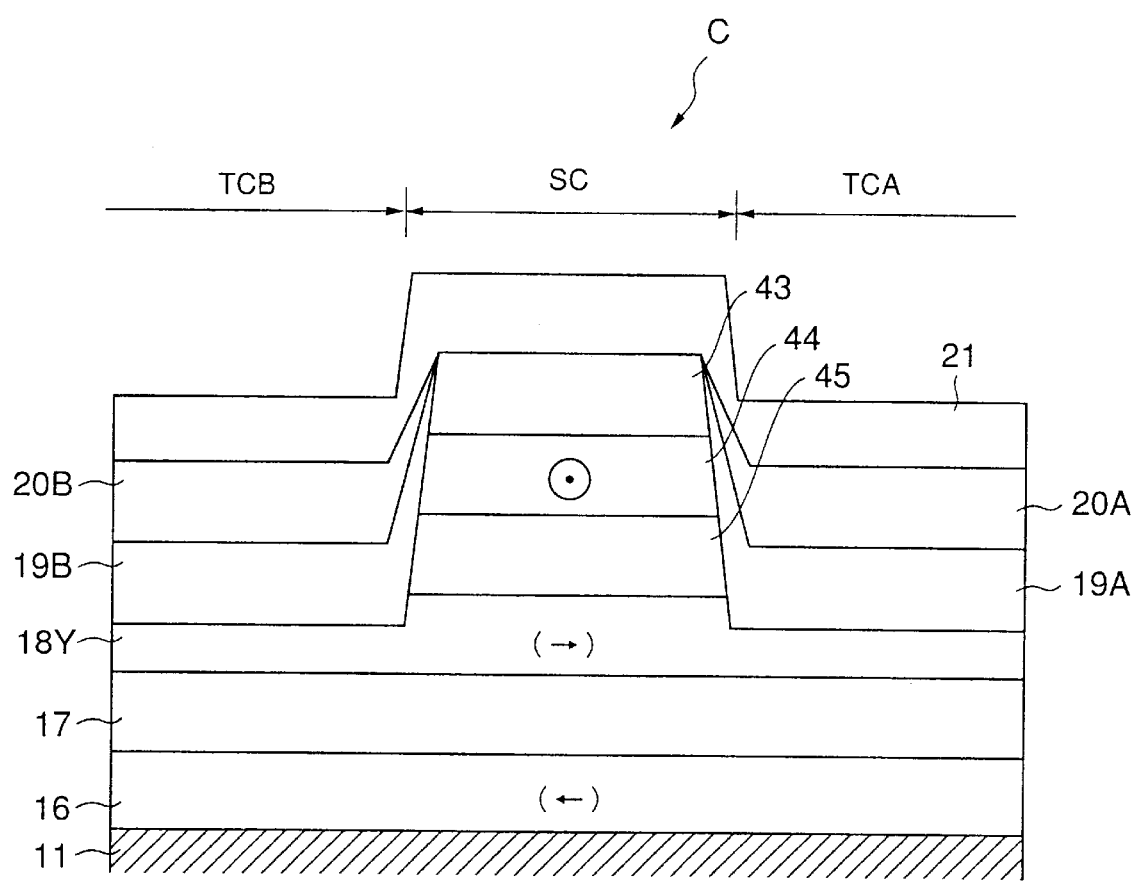
FIG. 7 is a sectional view of a principal part of an SVMR head of a third embodiment.

Next, a description will be given, based on FIG. 7, of a third embodiment of the present invention. FIG. 7 is a sectional view of a principal part of an SVMR head C of the third embodiment of the present invention. Unlike the above-described SVMR heads of the first and second embodiments, the SVMR head C of this embodiment is not of the overlay-type and has terminal parts TCA and TCB provided on both ends to have substantially the same height as a device part. The SVMR head C has a reverse layer structure of the device part, where a nonmagnetic layer 45, a pinned magnetic layer 44, and a second antiferromagnetic layer 43 applying a bias magnetic field to the pinned magnetic layer 44 are positioned in an upper part.

The SVMR head C also includes the first free magnetic layer 16, the antiparallel coupling intermediate layer 17, and a second free magnetic layer 18Y in the order described from the bottom in a lower layer part. The three layers 16, 17, and 18Y extend from the terminal part TCA to the other terminal part TCB. In the terminal parts TCA and TCB, the first antiferromagnetic layers 19A and 19B are formed on the second free magnetic layer 18Y.

Therefore, in a relationship between the first antiferromagnetic layers 19A and 19B and the three layers 16, 17, and 18Y, the first antiferromagnetic layers 19A and 19B and the three layers 16, 17, and 18Y are in an overlay state where the first antiferromagnetic layers 19A and 19B covers the three layers 16, 17, and 18Y.

Accordingly, the SVMR head C of the third embodiment also includes laminations of the first antiferromagnetic layers 19A and 19B, the second free magnetic layer 18Y, the antiparallel coupling intermediate layer 17, and the first free magnetic layer 16 on the terminal part TCA and TCB sides.

The same parts as those of the above-described SVMR heads of the first and second embodiments are marked with the same numerals. If no particular explanation is given, conditions such as a material and a magnetization direction are equal to those in the case of the first embodiment.

On both terminal part TCA and TCB sides of the above-described SVMR head C, first, the first antiferromagnetic layers 19A and 19B apply a bias magnetic field to the second free magnetic layer 18Y. Further, the magnetic field of the second free magnetic layer 18Y provides an antiparallel magnetic field to the first free magnetic layer 16 through the antiparallel coupling intermediate layer 17.

The magnetization orientation of the first free magnetic layer 16 and the magnetization direction of the second free magnetic layer 18Y are in an antiparallel state if no external magnetic field exists in the device part, and are turned with the antiparallel state being maintained when the signal magnetic field Hsig is input. At this point, the first free magnetic layer 16 and the second free magnetic layer 18Y are in an insensitive state on the terminal part TCA and TCB sides with their magnetization directions being fixed by the bias magnetic field from the first antiferromagnetic layers 19A and 19B. Therefore, according to the SVMR head C of the third embodiment, the first free magnetic layer 16 and the second free magnetic layer 18Y can also be certainly insensitive to the external magnetic field on the terminal part TCA and TCB sides. Accordingly, unlike the conventional overlay-type SVMR head, no problems of noise and crosstalk resulting from a free magnetic layer existing in terminal parts are caused.

As previously described, in the SVMR head C of the third embodiment, the first antiferromagnetic layers 19A and 19B covers the first free magnetic layer 16, the antiparallel coupling intermediate layer 17, and the second free magnetic layer 18Y on the terminal part TCA and TCB sides. Therefore, no nonmagnetic parts with broken crystals generated in processing an SVMR film exist around the device part in the first free magnetic layer 16 and the second free magnetic layer 18Y. That is, the SVMR head C, although not completely of the overlay-type, has the same advantage as that of the overlay-type. Further, since the bias magnetic field to the first free magnetic layer 16 uses the first antiferromagnetic layers 19A and 19B, no leakage magnetic field, which causes a problem in the case of using hard ferromagnetic layers, is generated, either.

Figure 8:
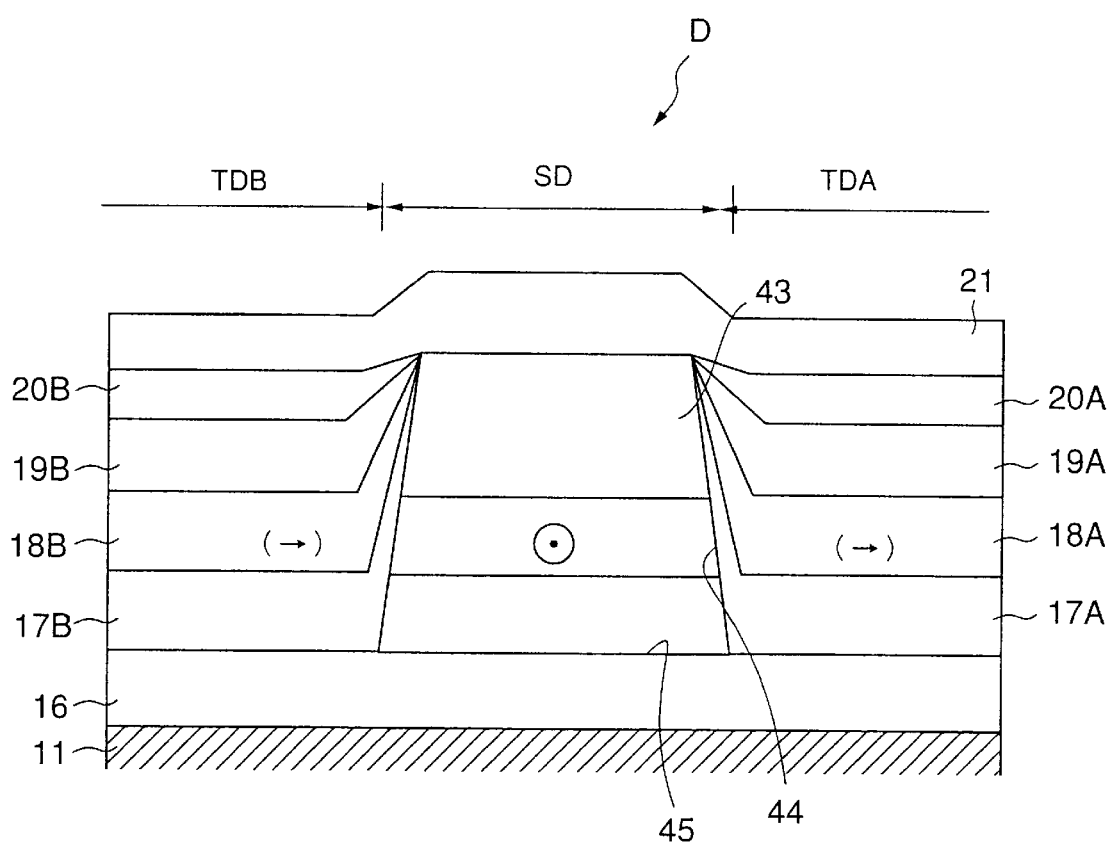
FIG. 8 is a sectional view of a principal part of an SVMR head of a fourth embodiment.

Next, a description will be given, based on FIG. 8, of a fourth embodiment of the present invention. FIG. 7 is a sectional view of a principal part of an SVMR head D of the fourth embodiment of the present invention. The SVMR head D of the fourth embodiment has a layer structure similar to the SVMR head C of the above-described third embodiment. In the SVMR head D of the fourth embodiment, only the first free magnetic layer 16 extends from a terminal part TCA to another terminal part TCB.

In the SVMR head D, the first antiferromagnetic layers 19A and 19B, the soft magnetic layers 18A and 18B, and antiparallel coupling intermediate layers 17A and 17B cover the first free magnetic layer 16 on the terminal part TCA and TCB sides.

In the third embodiment, laminations of the first antiferromagnetic layers 19A and 19B, the soft magnetic layers 18A and 18B, the antiparallel coupling intermediate layers 17A and 17B, and the first free magnetic layer 16 are also included on the terminal part TDA and TDB sides.

The same parts as those of the SVMR heads of the above-described first and third embodiments are marked with the same numerals. If no particular explanation is given, conditions such as a material and a magnetization direction are equal to those in the case of the above-described embodiments.

On the terminal part TDA and TDB sides of the above-described SVMR head D, first, the first antiferromagnetic layers 19A and 19B apply a rightward bias magnetic field to the soft magnetic layers 18A and 18B. Further, the magnetic field of the soft magnetic layers 18A and 18B provides an antiparallel (leftward) magnetic field to the terminal part TDA and TDB sides of the first free magnetic layer 16 through the antiparallel coupling intermediate layers 17A and 17B.

If no external magnetic field exists, the magnetization orientation of the first free magnetic layer 16 is leftward in the device part, following the magnetization orientation in the terminal parts. The magnetization orientation turns when the signal magnetic field Hsig is input. At this point, the first free magnetic layer 16 is in an insensitive state on the terminal part TDA and TDB sides with its magnetization direction being fixed by the bias magnetic field from the first antiferromagnetic layers 19A and 19B.

Therefore, the SVMR head D of the fourth embodiment produces the same effects as the SVMR heads of the above-described embodiments.

Next, a description will be given of production methods of the above-described SVMR heads of the present invention.

Figure 9:
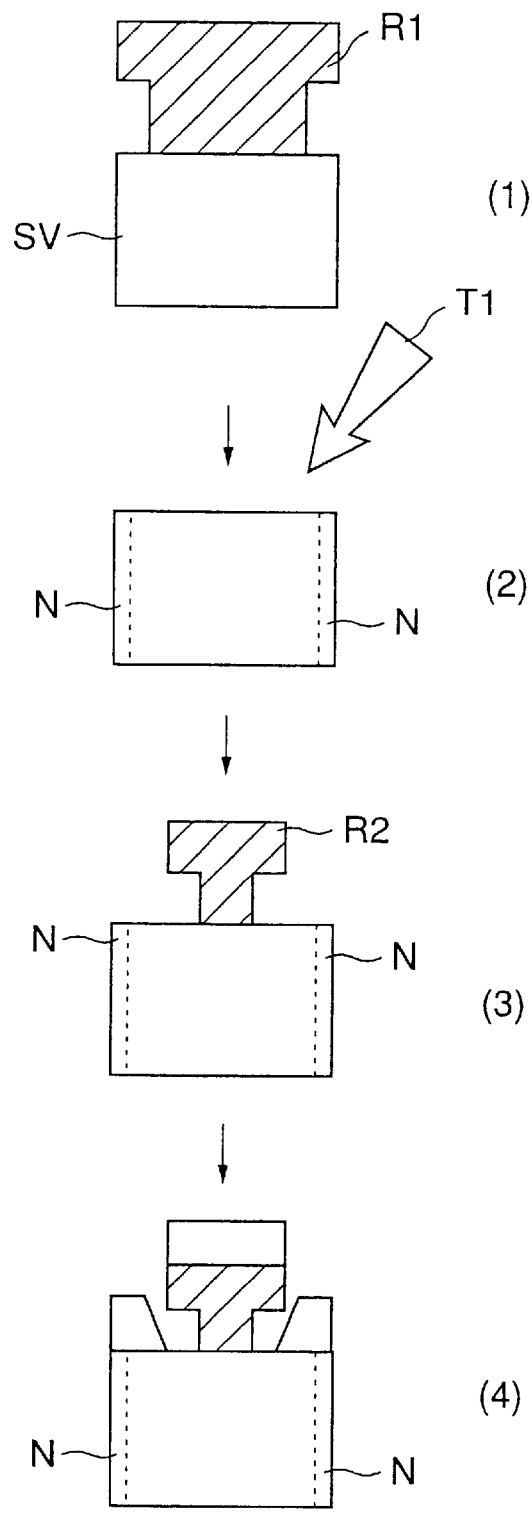
FIG. 9 is a diagram showing a production flow of the SVMR head of the first embodiment.

FIG. 9 is a flowchart showing a production process of the overlay-type SVMR head A described in the first embodiment.

In FIG. 9(1), after forming a lamination SV composed of at least the second antiferromagnetic layer 13, the pinned magnetic layer 14, the nonmagnetic layer 15, the first free magnetic layer 16, and the antiparallel coupling intermediate layer 17, the lamination SV is etched, with a resist R1 being placed thereon, into a device shape to a magnetic head to be used.

In FIG. 9(2), the above-mentioned resist R1 is removed. At this point, first processing in magnetic field I1 is performed so that the magnetization orientation of the pinned magnetic layer 14 is fixed substantially parallel to the signal magnetic field Hsig. For instance, the exchange coupling magnetic field of the second antiferromagnetic layer 13 and the pinned magnetic layer 14 is set to be 100 Oe or over; preferably between 200 and 600 Oe. Conventionally, at least 600 Oe has been required to fix the pinned magnetic layer, but in the present invention, the exchange coupling magnetic field may be weaker on the pinned magnetic layer 14 side since the bias magnetic field on the free magnetic layer side is generated by the first antiferromagnetic layers 19A and 19B.

In FIG. 9(3), in order to form overlay-type terminal parts, a resist R2, which is narrower in width than the resist R1, is placed on a region of the lamination SV which region is formed into the device part. At this point, the lamination SV has the nonmagnetic parts N formed by breaking a crystal structure by etching in both of its ends. Therefore, the resist R2 may be positioned with less accuracy than that in a conventional case. By narrowing the width of the resist R2, a device width may be set to correspond to a narrow-width track of a magnetic recording medium of high recording density.

In FIG. 9(4), the terminal parts are formed by layering at least the soft magnetic layers 18A and 18B and the first antiferromagnetic layers 19A and 19B so that both ends of the lamination SV are covered thereby.

Thereafter, the resist R2 is removed, and second processing in magnetic field T2 (not shown in the drawing) is performed so that the first antiferromagnetic layers 19A and 19B apply the bias magnetic field substantially perpendicular to the signal magnetic field Hsig to the soft magnetic layers 18A and 18B. Here, the exchange coupling magnetic field is set between 100 and 400 Oe, for instance. A magnetic material of a regular or irregular type may be used for the first antiferromagnetic layers 19A and 19B and the second antiferromagnetic layer 13. In the case of using a magnetic material of the irregular type, the processing in magnetic field may be omitted. In the case of using a material of the regular type for the first antiferromagnetic layers 19A and 19B and the second antiferromagnetic layer 1, it is preferable that at least one of them should have a Neel temperature of 300° C. or over.

The SVMR head B show in the second embodiment may also be produced in accordance with FIG. 9. In this case, the first lamination SV shall at least be the second antiferromagnetic layer 13, the pinned magnetic layer 14, the nonmagnetic layer 15, the first free magnetic layer 16, the antiparallel coupling intermediate layer 17, and the second free magnetic layer, and overlay parts forming the terminal parts includes at least the first antiferromagnetic layers 19A and 19B.

Next, a description will be given of a production method of the SVMR head C of the third embodiment.

Figure 10:
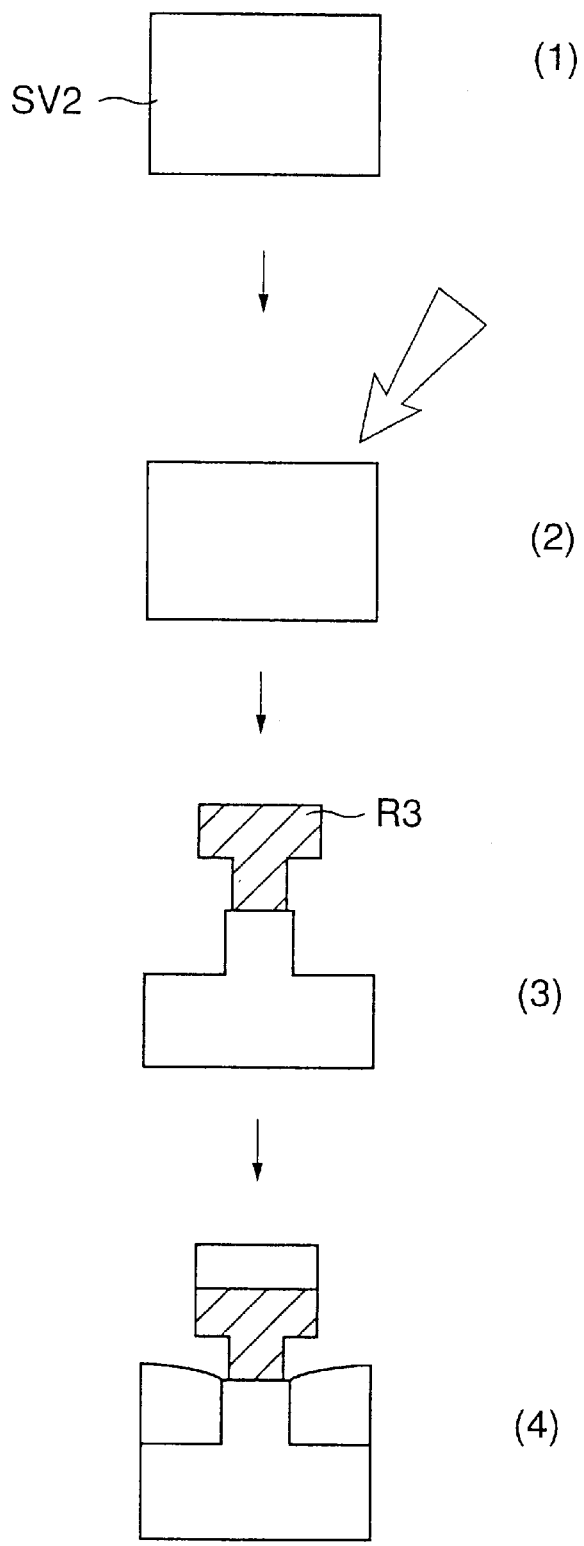
FIG. 10 is a diagram showing a production flow of the SVMR head of the third embodiment.

In FIG. 10(1), a lamination SV2 shall include at least the first free magnetic layer 16, the antiparallel coupling intermediate layer 17, the first free magnetic layer 18Y, the nonmagnetic layer 45, the pinned magnetic layer 44, and the second antiferromagnetic layer.

In FIG. 10(2), first processing in magnetic field is performed. Conditions are equal to those of the case of above-mentioned FIG. 9(2).

In FIG. 10(3), etching is performed with an R3 being placed on the lamination SV2 so that a region to be formed into the device part remains. The etching is stopped when the second antiferromagnetic layer 18Y is exposed.

In FIG. 10(4), at least the first antiferromagnetic layers 19A and 19B are formed on the terminal part sides. Thereafter, the resist R3 is removed, and second processing in magnetic field T4 (not shown in the drawing) is performed so that the first antiferromagnetic layers 19A and 19B apply the bias magnetic field to the end sides of the second free magnetic layer.

The SVMR head D shown in the fourth embodiment may be produced similarly in accordance with FIG. 10. In this case, the first lamination SV2 shall at least be the first free magnetic layer 16, the nonmagnetic layer 45, the pinned magnetic layer 44, and the second antiferromagnetic layer 43, and laminations including at least the antiparallel coupling intermediate layers 17A and 17B, the soft magnetic layers 18A and 18B, and the first antiferromagnetic layers 19A and 19B are formed.

The SVMR heads A, B, C, and D of the above-described embodiments of the present invention may be used as magnetic heads for reproduction. The magnetic heads are used by being mounted in hard disk drives as magnetic recording drives.

Figure 11:
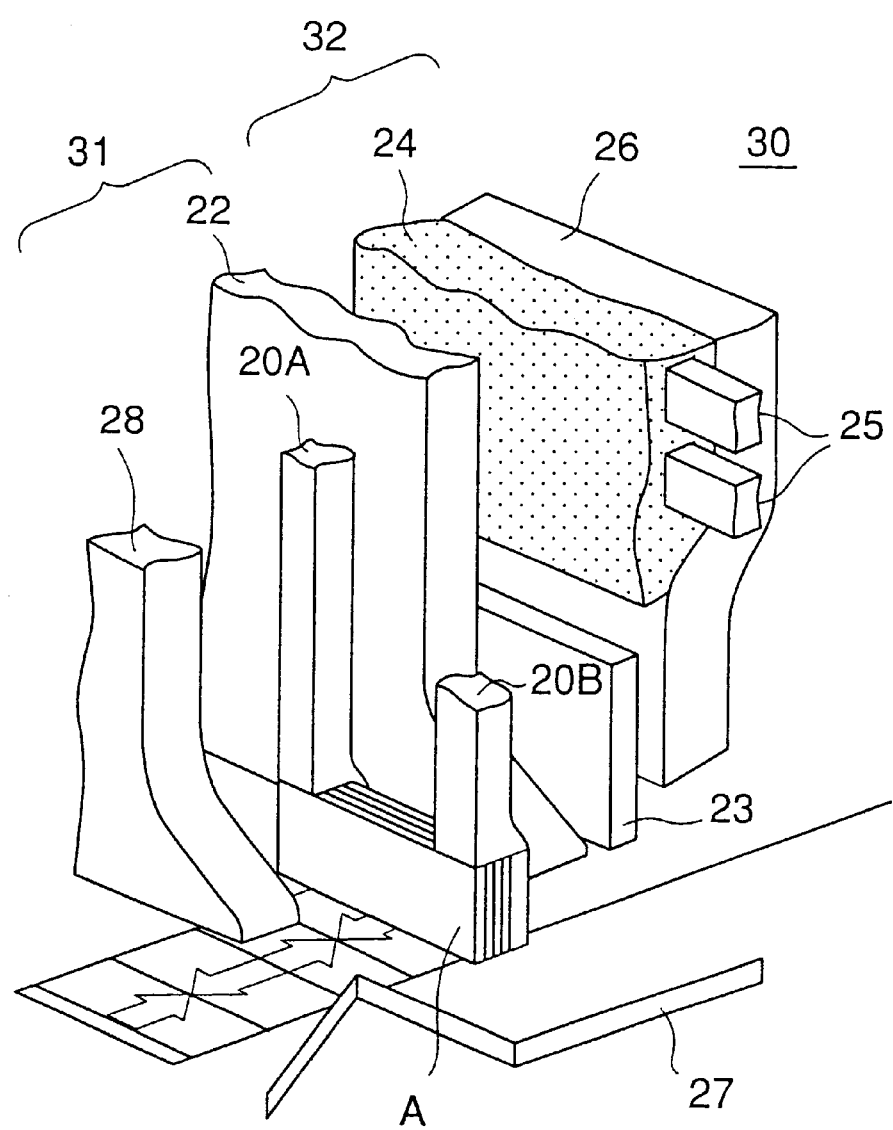
FIG. 11 is a diagram of the SVMR head of the first embodiment incorporated into a hard disk drive.

FIG. 11 shows an entire structure of a composite-type magnetic head 30 where the SVMR head A of FIG. 4 is incorporated as the reproducing head of a hard disk drive as an example together with an induction type magnetic head for magnetic recording. Also shown is a hard disk 27 as a magnetic recording medium disposed opposite to the composite-type magnetic head 30.

The SVMR head A is employed in the composite-type magnetic head 30 as a reproducing magnetic head 31. The composite-type magnetic head 30, which is composed mainly of the reproducing magnetic head 31 and a recording magnetic head 32, is of a merge type with a reproducing upper shield 22 of the reproducing magnetic head 31 also serving as a recording lower pole (lower core) of the recording magnetic head 32, and has a piggyback structure where the recording magnetic head 32 is attached to the rear part of the reproducing magnetic head 31.

In other words, as shown in FIG. 11, the reproducing magnetic head 31 includes the SVMR head A, which includes the electrode terminals 20A and 20B. The reproducing magnetic head 31 further includes a reproduction lower shield 28 and the reproduction upper shield 22 that are arranged on both sides of the SVMR head A.

The above-described magnetic recording head 32 includes a magnetic recording coil 25, an organic insulating layer 24 surrounding the recording coil, and the recording lower pole 22 and recording upper pole 26 that are arranged on both sides of the organic insulating layer 24 and a magnetic gap film 23. The reproduction lower shield 22 also serves as the recording lower pole of a recording part. The recording upper pole 22 is fixed with the organic insulating layer 24 and the pole gap film 23 being interposed between the recording upper pole 22 and the recording upper pole 26 arranged opposite thereto. The recording coil 25 is buried inside the above-described organic insulation layer 24. Thus, the reproducing magnetic head 31 and the recording magnetic head 32 are integrally formed in the composite-type magnetic head 30.

Figure 12:
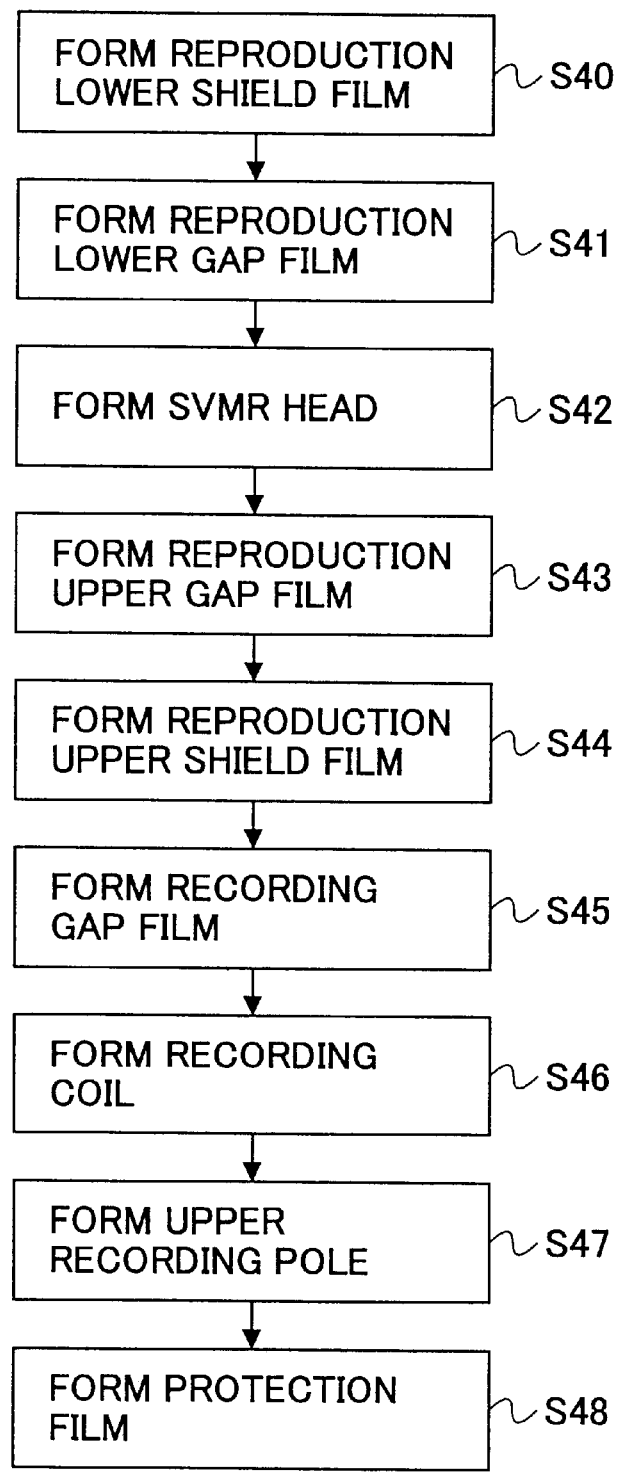
FIG. 12 is a diagram showing a production flow of the SVMR head employed in a composite-type magnetic head.

Next, a description will be given based on a production flow of the above-described composite-type magnetic head 30, which production flow is shown in FIG. 12.

First, in step S40, a film of the reproduction lower shield 28 is formed. The reproduction lower shield 28 is formed of, for instance, a film of an iron nitride-based material of Fe—N.

In step S41, a reproduction lower gap film is formed. The reproduction lower gap film is formed of aluminum oxide ($Al_2O_3$), for instance.

In step S42, the lamination of the SVMR head A shown in FIG. 4 is formed in accordance with the process shown in FIG. 9

In step S43, a reproduction upper gap film is formed. The reproduction under gap film is formed of aluminum oxide ($Al_2O_3$), for instance.

In step S44, the reproduction upper shield 22 is formed. The reproduction upper shield 22 is formed of nickel-iron (NiFe), for instance.

In step S45, a recording gap layer is formed.

In step S46, the recording coil 25 is formed.

In step S47, the upper recording pole 26 is formed.

In step S48, a protection film is formed.

Figure 13:
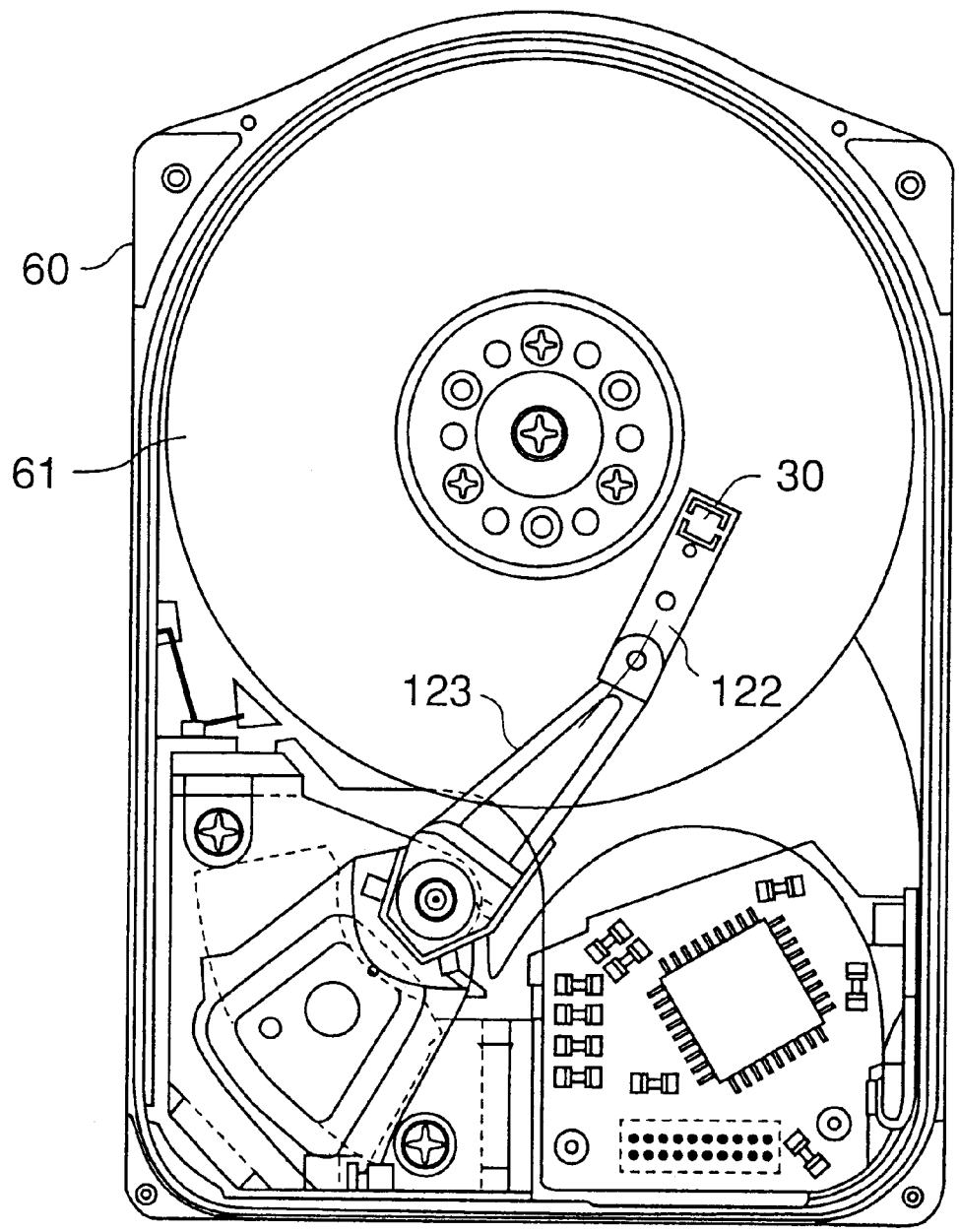
FIG. 13 is a diagram showing a principal part of a magnetic recording medium drive in which a magnetic head including an SVMR head of the present invention is mounted.

Finally, a brief description will be given of a magnetic recording medium drive having an SVMR head of the present invention mounted therein. FIG. 13 is a diagram showing a principal part of a magnetic recording medium drive. A magnetic recording medium drive 60 having a hard disk 61 mounted therein as a magnetic recording medium so as to be rotated. The above-described composite-type magnetic head 30 of the present invention is arranged to oppose the surface of the hard disk 61 with a given floatation amount so that magnetic recording and reproduction operations are performed. The composite-type magnetic head is fixed to the front end part of a slider 122 extending from an arm 123. In positioning the magnetic head 30, a two-stage actua that is a combination of a normal actuator and an electromagnetic fine-movement actuator can be employed.

Preferred embodiments of the present invention have been described in detail. The present invention is not limited to the specific embodiments, but variations and modifications may be made without departing from the scope of the essential points of the present invention described in later-described claims.

As is apparent from what has been described in detail, according to the SVMR head of the present invention, the laminations formed of at least the first free magnetic layer, the antiparallel coupling intermediate layer, the soft magnetic layer (or the second free magnetic layer), and the first antiferromagnetic layer are included on the terminal part sides, so that the terminal part sides of the first free magnetic layer (and the second free magnetic layer) can be made insensitive to an external magnetic field. Therefore, the first free magnetic layer (and the second free magnetic layer) is turned into a signal magnetic domain in the device part. Accordingly, the edge parts of the device part for detecting the signal magnetic field Hsig and the edge parts of the terminal parts are distinguished so that the generation of Barkhausen noises is controlled. Further, processing accuracy can be increased. Furthermore, the generation of leakage magnetic fields can be controlled considerably since the magnetization direction of the free magnetic layer is restricted by using the hard hard-magnetic antiferromagnetic layers.

Therefore, in the case of using the SVMR head of the present invention, the magnetization direction of the free magnetic layer is turned with respect to the signal magnetic field Hsig from a magnetic recording medium so that the resistance value of the SVMR device can be changed linearly.

What is claimed is:

1. A spin-valve magnetoresistive head having a device part and terminal parts provided to both ends of the device part, the spin-valve magnetoresistive head comprising:

a first free magnetic layer formed from one to the other of the terminal parts; and a lamination in the terminal parts on said first free magnetic layer, the lamination including an antiparallel coupling intermediate layer, a soft magnetic layer, and a first antiferromagnetic layer, the antiparallel coupling intermediate layer having a function of making front and rear magnetization orientation of said soft magnetic layer and said first free magnetic layer contacting the antiparallel coupling intermediate layer substantially antiparallel, the first antiferromagnetic layer applying to the soft magnetic layer a bias magnetic field substantially perpendicular to a direction of an external magnetic field to be detected.

2. The spin-valve magnetoresistive head as claimed in claim 1, wherein:

the antiparallel coupling intermediate layer is formed from the one to the other of the terminal parts through the device part; and a nonmagnetic layer, a pinned magnetic layer, and a second antiferromagnetic layer are provided in an order described under said first free magnetic layer from a side thereof.

3. The spin-valve magnetoresistive head as claimed in claim 1, wherein:

the antiparallel coupling intermediate layer and the soft magnetic layer are formed from the one to the other of the terminal parts through the device part;

the soft magnetic layer serves as a second free magnetic layer; and a nonmagnetic layer, a pinned magnetic layer, and a second antiferromagnetic layer are provided in an order described under said first free magnetic layer from a side thereof.

4. The spin-valve magnetoresistive head as claimed in claim 1, wherein:

the antiparallel coupling intermediate layer and the soft magnetic layer are formed from the one to the other of the terminal parts;

the soft magnetic layer serves as a second free magnetic layer; and a nonmagnetic layer, a pinned magnetic layer, and a second antiferromagnetic layer are provided in an order described on the second free magnetic layer from a side thereof in the device part.

5. The spin-valve magnetoresistive head as claimed in claim 1, wherein a nonmagnetic layer, a pinned magnetic layer, and a second antiferromagnetic layer are provided in an order described on said first free magnetic layer from a side thereof in the device part.

6. The spin-valve magnetoresistive head as claimed in any of claims 1 to 5, wherein the first antiferromagnetic layer has an exchange coupling magnetic field of 100 to 400 Oe with the soft magnetic layer or the second free magnetic layer.

7. The spin-valve magnetoresistive head as claimed in any of claims 1 to 5, wherein the antiparallel coupling intermediate layer includes ruthenium.

8. A composite-type magnetic head having a magnetic head for reproduction and a magnetic head for recording, wherein:

the magnetic head for reproduction is a spin-valve magnetoresistive head comprising a device part, terminal parts provided to both ends of the device part, and a lamination including a first free magnetic layer formed from one to the other of the terminal parts, an antiparallel coupling intermediate layer in the terminal parts on the first free magnetic layer, a soft magnetic layer, and a first antiferromagnetic layer, the antiparallel coupling intermediate layer having a function of making front and rear magnetization orientation of said soft magnetic layer and said first free magnetic layer contacting the antiparallel coupling intermediate layer substantially antiparallel, the first antiferromagnetic layer applying to the soft magnetic layer a bias magnetic field substantially perpendicular to a direction of an external magnetic field to be detected.

9. A magnetic recording medium drive including a magnetic recording medium and a composite-type magnetic head for recording and reproduction, the composite-type magnetic head opposing a surface of the magnetic recording medium, the magnetic recording medium drive comprising:

a spin-valve magnetoresistive head as a reproducing magnetic head part of the composite-type magnetic head, the spin-valve magnetoresistive head including a device part, terminal parts provided to both ends of the device part, and a lamination including a first free magnetic layer formed from one to the other of the terminal parts, an antiparallel coupling intermediate layer in the terminal parts on the first free magnetic layer, a soft magnetic layer, and a first antiferromagnetic layer, the antiparallel coupling intermediate layer having a function of making front and rear magnetization orientation of magnetic layer contacting the antiparallel coupling intermediate layer substantially antiparallel, the first antiferromagnetic layer applying to the soft magnetic layer a bias magnetic field substantially perpendicular to a direction of an external magnetic field to be detected.

* * * * *